United States Patent
Hsu et al.

(10) Patent No.: US 12,401,317 B2
(45) Date of Patent: Aug. 26, 2025

(54) SMUDGE DETECTION SYSTEM AND ITS SMUDGE DETECTION DEVICE

(71) Applicant: UNP ENERGY CO., LTD., Taipei (TW)

(72) Inventors: Min-Hung Hsu, Taipei (TW); Hsin-Hsi Li, Taipei (TW)

(73) Assignee: UNP ENERGY CO., LTD., Taipei (TW)

( * ) Notice: Subject to any disclaimer, the term of this patent is extended or adjusted under 35 U.S.C. 154(b) by 88 days.

(21) Appl. No.: 18/538,747

(22) Filed: Dec. 13, 2023

(65) Prior Publication Data
US 2025/0202417 A1    Jun. 19, 2025

(51) Int. Cl.
*H02S 40/10* (2014.01)
*H02S 40/38* (2014.01)
*H02S 50/15* (2014.01)

(52) U.S. Cl.
CPC ............. *H02S 40/10* (2014.12); *H02S 40/38* (2014.12); *H02S 50/15* (2014.12)

(58) Field of Classification Search
None
See application file for complete search history.

(56) References Cited

U.S. PATENT DOCUMENTS

| | | | |
|---|---|---|---|
| 2017/0338771 | A1 | 11/2017 | Gostein et al. |
| 2018/0331654 | A1* | 11/2018 | Gostein ............. G01N 21/9501 |

FOREIGN PATENT DOCUMENTS

| | | |
|---|---|---|
| CN | 213072559 U | 4/2021 |
| ES | 1285699 U | 1/2022 |
| TW | M609396 U | 3/2021 |
| TW | M623556 U | 2/2022 |
| TW | 202219788 A | 5/2022 |
| TW | 202222030 A | 6/2022 |

* cited by examiner

*Primary Examiner* — Daniel P Malley, Jr.
(74) *Attorney, Agent, or Firm* — Hayes Soloway P.C.

(57) ABSTRACT

A smudge detection device includes a container, a power supply battery, a smudge detection module, a photovoltaic device and a mainboard module. The container is formed with a recess at the top thereof, and a light transmissive cover covering the recess. The smudge detection module is located in the recess to detect the shading degree of the light transmissive cover that is covered. The photovoltaic device is disposed on the container to generate and transmit electric energy into the power supply battery. The mainboard module is electrically connected to the smudge detection module, the power supply battery and the photovoltaic device, and connected to a host server through network architecture, so as to respectively transmit power supply value of the electric energy and the shading degree of the light transmissive cover to the host server.

15 Claims, 6 Drawing Sheets

SMUDGE DETECTION SYSTEM AND ITS SMUDGE DETECTION DEVICE

BACKGROUND

Field of Disclosure

The present disclosure relates to a detection system. More particularly, the present disclosure relates to a smudge detection system and its smudge detection device.

Description of Related Art

Generally, surfaces of many objects (e.g., telescope lens, building glass or solar panels, etc.) need to be cleaned regularly by personnel to maintain their original appearance or service performance. For example, when current solar power plants are built, multiple solar modules are usually arranged side by side in order, and then the electric energy generated by the solar modules is input into the mains system and resold to electricity selling units.

However, since solar energy sites are located outdoors for a long time, dust accumulated on the solar modules, sludge mixed by dust and rain, or snow or frost in cold weather will affect the photoelectric conversion efficiency of the solar modules. Currently, a solution that is taken so far is to regular inspection manually for cleaning the smudge on the light incident surface of the solar modules. In this way, since the progress of pollution is very difficult to predict, it is necessary to increase inspector shifts, thereby increasing labor costs and cleaning costs.

Thus, the above-mentioned technology obviously still has inconveniences and defects, which are issues that the industry needs to solve urgently.

SUMMARY

One aspect of the present disclosure is to provide a smudge detection system and its smudge detection device for solving the difficulties mentioned above in the prior art.

In one embodiment of the present disclosure, a smudge detection device that is provided includes a container, a power supply battery, a smudge detection module, a photovoltaic device and a mainboard module. The container includes a main body disposed on at least one power generation module, a recess formed on a top of the main body, and a light transmissive cover covering the recess. The smudge detection module is located within the recess for detecting a shielding degree of the light transmissive cover being covered by foreign matters. The photovoltaic device is disposed on the main body for generating and transmitting electric energy into the power supply battery. The mainboard module is received within the recess, and includes a communication unit connected to a host server through a network architecture, and a control unit electrically connected to the smudge detection module, the power supply battery, the communication unit and the photovoltaic device, for respectively transmitting power supply value of the electric energy and the shielding degree of the light transmissive cover to the host server.

According to one or more embodiments of the present disclosure, in the smudge detection device, the light transmissive cover is a single light-transmissive plate, and the single light-transmissive plate is divided into a first area and a second area. The photovoltaic device is directly integrated into the first area of the single light-transmissive plate, and the smudge detection module is faced towards the second area of the single light-transmissive plate from inside the recess for detecting the shielding degree of the second area being covered.

According to one or more embodiments of the present disclosure, in the smudge detection device, the smudge detection module includes at least one outputting unit and a receiving unit. The outputting unit is disposed within the recess, and electrically connected to the control unit for sending energy waves towards the light transmissive cover. The receiving unit is disposed within the recess, and electrically connected to the control unit for receiving reflected signals returned from the light transmissive cover for the control unit to transmit the reflected signals to the host server.

According to one or more embodiments of the present disclosure, in the smudge detection device, the outputting unit includes a plurality of outputting units, and the outputting units are spaced arranged to surround the receiving unit.

According to one or more embodiments of the present disclosure, in the smudge detection device, the output unit is a light emitter, and the receiving unit is a light sensor, or the output unit is an ultrasonic transmitter, and the receiving unit is an ultrasonic receiver.

According to one or more embodiments of the present disclosure, in the smudge detection device, the smudge detection module includes a camera unit disposed within the recess, and electrically connected to the control unit for capturing images of the light transmissive cover for the control unit to transmit the images to the host server.

According to one or more embodiments of the present disclosure, in the smudge detection device, the mainboard module further includes a global positioning system (GPS) unit electrically connected to the control unit for obtaining location coordinates where the container is situated at, so that the control unit transmits the location coordinates of the container to the host server.

According to one or more embodiments of the present disclosure, in the smudge detection device, the GPS unit further obtains an absolute time where the container is situated at, so that the control unit is able to activate the smudge detection module based on the absolute time of the container.

In one embodiment of the present disclosure, a smudge detection system is suitable for determining whether a surface of an observed object is smudgy, and the smudge detection system includes a host server and a smudge detection device. The smudge detection device includes a power supply battery, a container, a smudge detection module, a photovoltaic device and a mainboard module. The container includes a main body disposed on the observed object, a recess formed on a top of the main body, and a light transmissive cover covering the recess. The smudge detection module is located within the recess for detecting a shielding degree of the light transmissive cover being covered by foreign matters. The photovoltaic device is disposed on the main body for generating and transmitting electric energy into the power supply battery. The mainboard module is received within the recess, electrically connected to the smudge detection module, the power supply battery and the photovoltaic device, and connected to a host server through a network architecture, for respectively transmitting power supply value of the electric energy and the shielding degree of the light transmissive cover to the host server. The host server determines whether the shielding degree of the light transmissive cover exceeds a preset threshold, and whether the power supply value of the photovoltaic device is within a predetermined range. When the host server determines that the shielding degree exceeds the preset threshold, and the power supply value of the photovoltaic device is not within the predetermined range, the host server issues a smudge-detected alert outwardly.

According to one or more embodiments of the present disclosure, in the smudge detection system, the light transmissive cover is a single light-transmissive plate, and the single light-transmissive plate is divided into a first area and a second area. The photovoltaic device is directly integrated into the first area of the single light-transmissive plate, and the smudge detection module faces towards the second area of the single light-transmissive plate from inside the recess for detecting the shielding degree of the second area being covered.

According to one or more embodiments of the present disclosure, in the smudge detection system, the smudge detection module includes at least one outputting unit and a receiving unit. The outputting unit is disposed within the recess, and electrically connected to the mainboard module for sending energy waves towards the light transmissive cover. The receiving unit is disposed within the recess, and electrically connected to the mainboard module for receiving reflected signals returned from the light transmissive cover. The mainboard module transmits the reflected signals to the host server, so that the host server is able to compare a difference between the reflected signal and the preset threshold.

According to one or more embodiments of the present disclosure, in the smudge detection system, the outputting unit includes a plurality of outputting units, and the outputting units are spaced arranged to surround the receiving unit.

According to one or more embodiments of the present disclosure, in the smudge detection system, the output unit is a light emitter, and the receiving unit is a light sensor, or the output unit is an ultrasonic transmitter, and the receiving unit is an ultrasonic receiver.

According to one or more embodiments of the present disclosure, in the smudge detection system, the smudge detection module includes a camera unit disposed within the recess, and electrically connected to the mainboard module for capturing images of the light transmissive cover for the mainboard module to transmit the images to the host server.

According to one or more embodiments of the present disclosure, in the smudge detection system, when the host server determines whether the power supply value of the photovoltaic device is within the predetermined range, the host server further proceeds to collect an ideal power supply value of the photovoltaic device, to compare the power supply value of the photovoltaic device with the ideal power supply value to obtain a difference value, to determine whether the difference value is in the predetermined range, and to issue the smudge-detected alert outwardly when the difference value is not within the predetermined range.

According to one or more embodiments of the present disclosure, in the smudge detection system, the mainboard module further includes a global positioning system (GPS) unit electrically connected to the mainboard for obtaining location coordinates where the container is situated at, so that the mainboard transmits the location coordinates of the container to the host server.

When the host server determines whether the power supply value of the photovoltaic device is within the predetermined range, the host server further proceeds to obtain weather data and real-time sunshine data based on the location coordinates of the container, to estimate an expected power supply value based on the weather data and the real-time sunshine data, to compare the power supply value and the expected power supply value of the photovoltaic device to obtain a difference value, and to issue the smudge-detected alert outwardly when the difference value is not within the predetermined range.

Thus, through the construction of the embodiments above, the disclosure is able to accurately decide whether an observed object is smudgy, so as to further timely send labor to eliminate abnormalities, thereby stabilizing inspector shift time and saving labor and cleaning costs.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Figure 1:
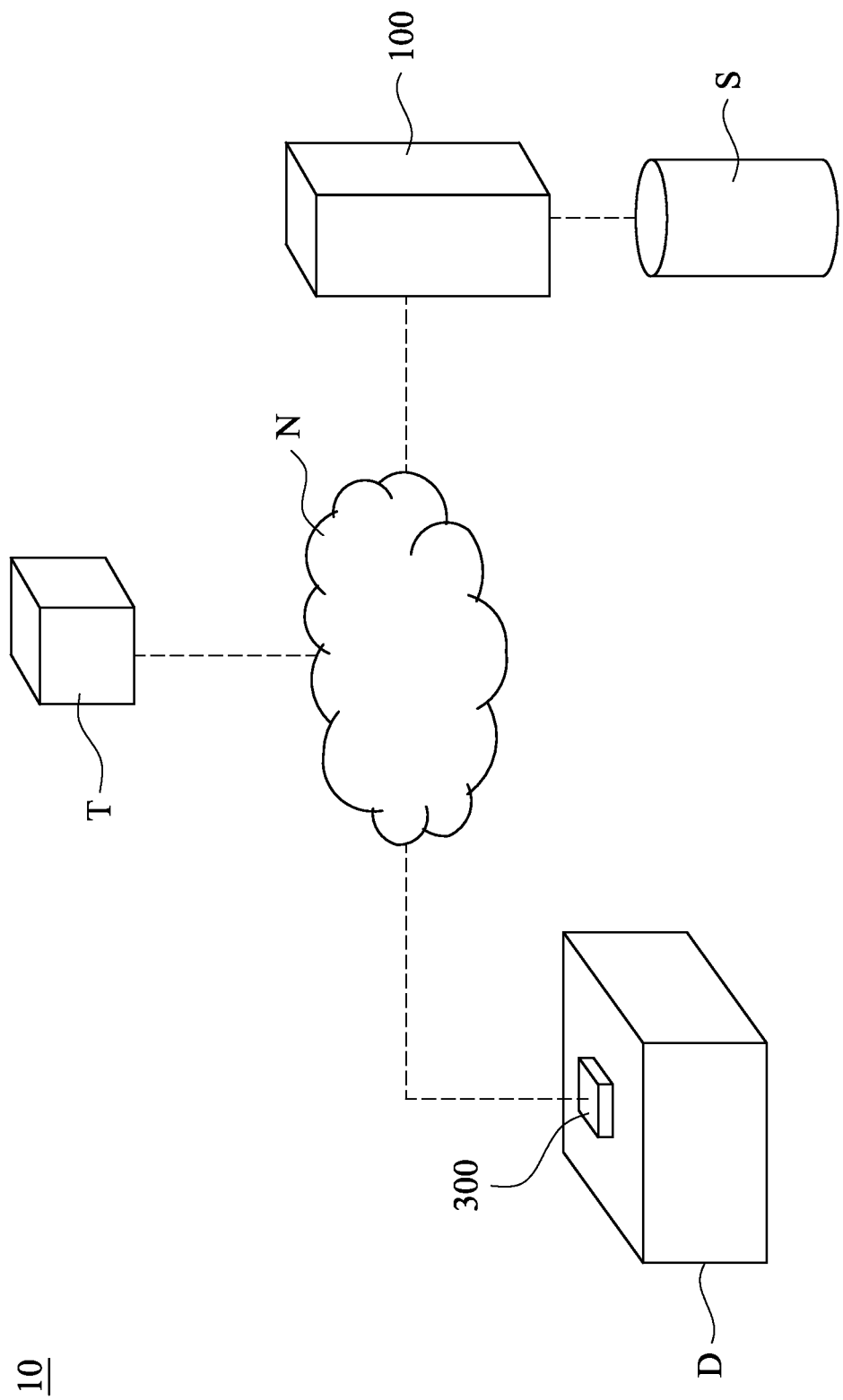
FIG. 1 is a schematic view of a smudge detection system according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
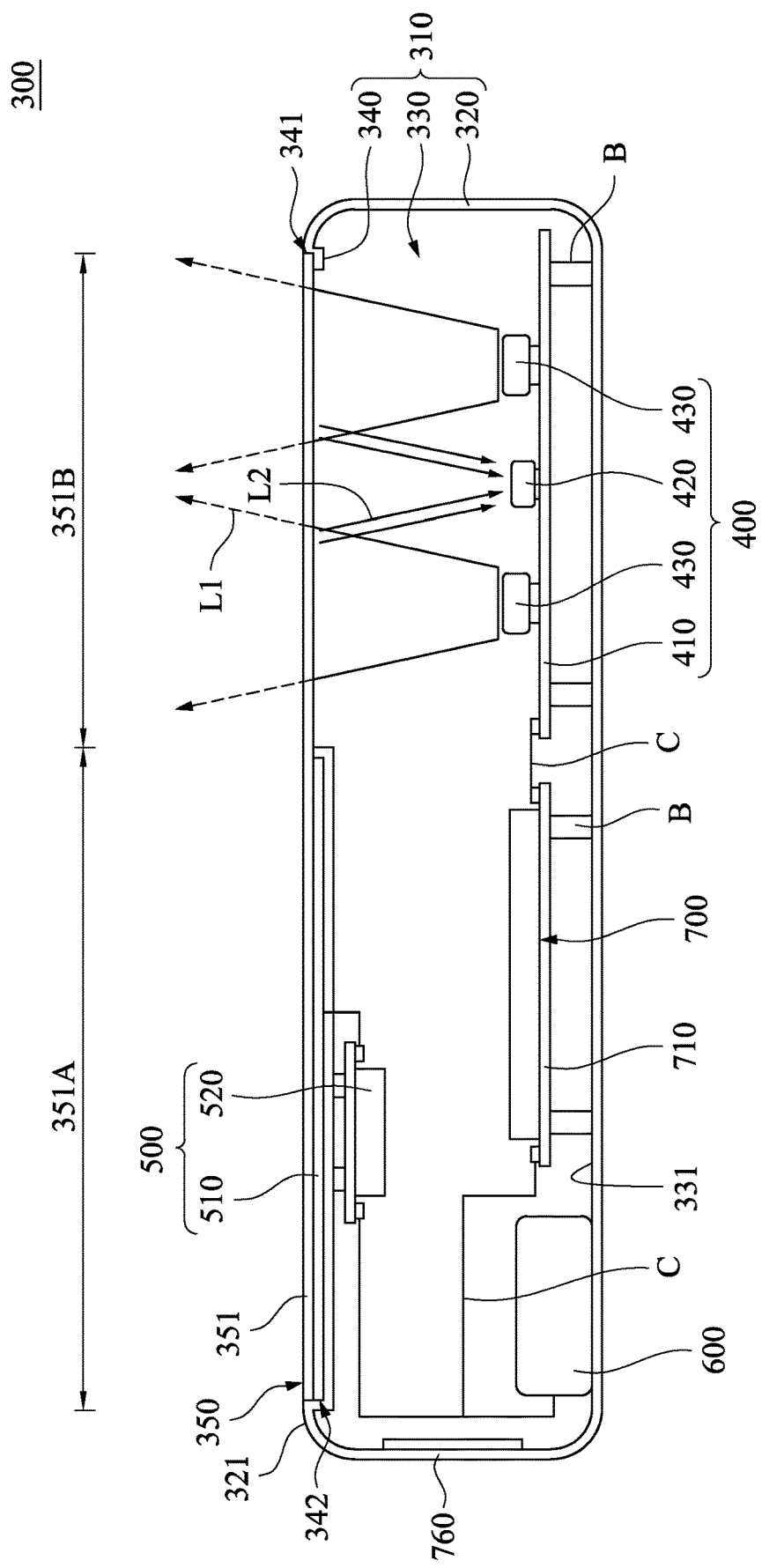
FIG. 2 is a schematic view of the smudge detection device in FIG. 1.
Figure 3:
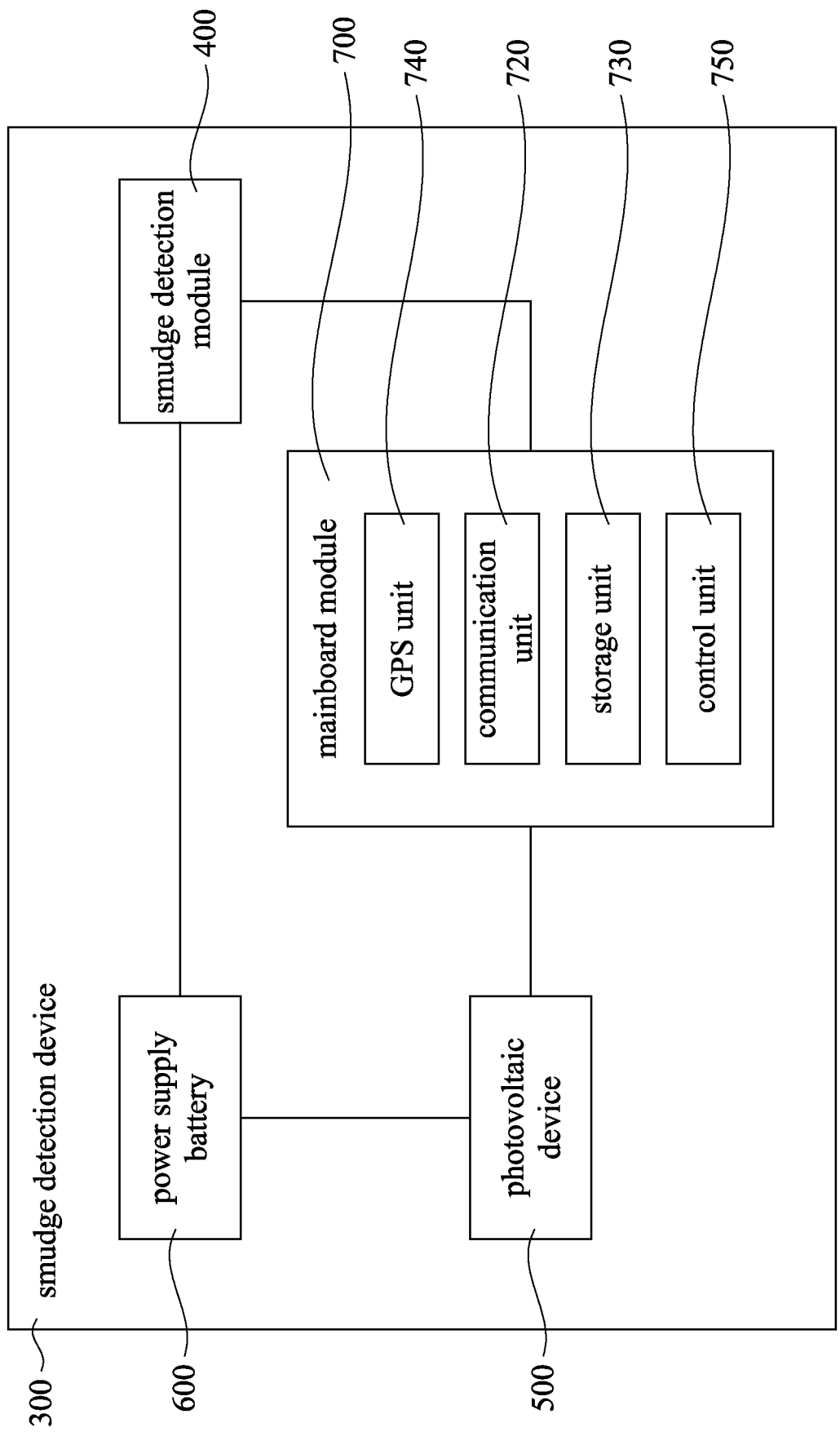
FIG. 3 is a block diagram of the smudge detection device in FIG. 1.

Reference is now made to FIG. 1 to FIG. 3, in which FIG. 1 is a schematic view of a smudge detection system 10 according to one embodiment of the present disclosure, FIG. 2 is a schematic view of the smudge detection device 300 in FIG. 1, and FIG. 3 is a block diagram of the smudge detection device 300 in FIG. 1. As shown in FIG. 1 to FIG. 3, in this embodiment, the smudge detection system 10 is suitable for determining whether a surface of an observed object D is contaminated (e.g., smudgy), and the smudge detection system 10 includes a host server 100 and at least one smudge detection device 300. The host server 100 is connected to the smudge detection device 300 through a network architecture N. The smudge detection device 300 is physically disposed on the aforementioned observed object D to detect whether the surface of the aforementioned observed object D is contaminated (e.g., smudgy).

It is noted, the disclosure is not limited to the type of the aforementioned observed object D. For example, the aforementioned observed object D is telescope lens, building glass or solar panels, etc.

The smudge detection device 300 includes a container 310, a power supply battery 600, a smudge detection module 400, a photovoltaic device 500 and a mainboard module 700. The container 310 includes a main body 320, a recess 330 and a light transmissive cover 350. The main body 320 is arranged aside the aforementioned observed object D. The recess 330 is formed on a top 321 of the main body 320. The light transmissive cover 350 covers the recess 330, and further totally covers the recess 330 of the container 310. The smudge detection module 400 is located within the recess 330 and facing towards the light transmissive cover 350 for performing smudge detection which is to detect a shielding degree of the light transmissive cover being covered by foreign matters within the recess 330. The photovoltaic device 500 is arranged aside the aforementioned observed object D. In the embodiment, the photovoltaic device 500 is single and disposed on the main body 320. The mainboard module 700 is electrically connected to the smudge detection module 400, the power supply battery 600 and the photovoltaic device 500, and connected to the host server 100 through the network architecture N for respectively transmitting power supply value of the electric energy and the shielding degree of the light transmissive cover 350 to the host server 100. In this embodiment, the power supply battery 600 is located within the container 310, and the photovoltaic device 500 is located within the recess 330 to generate and transmit electrical energy to the power supply battery 600. The power supply battery 600 is able to supply working power to various components of the smudge detection device 300, however, the disclosure is not limited thereto.

Thus, the host server 100 determines whether the shielding degree of the light transmissive cover 350 exceeds a preset threshold, and whether the power supply value of the photovoltaic device 500 is within a predetermined range. When the host server 100 determines that the shielding degree exceeds the preset threshold, and the power supply value of the photovoltaic device 500 is not within the predetermined range, the host server 100 issues a smudge-detected alert (e.g., text message, email or other audio and video signal) outwardly to a terminal T (e.g., mobile phone, computer or other cloud server).

Thus, through the construction of the embodiments above, the disclosure is able to accurately decide whether an observed object D is smudgy, so as to further timely send labor to eliminate abnormalities, thereby stabilizing inspector shift time and saving labor and cleaning costs.

More specifically, in this embodiment, the power supply battery 600, the mainboard module 700 and the smudge detection module 400 are all fixedly disposed at a bottom 331 of the recess 330, and the power supply battery 600, the smudge detection module 400 and the mainboard module 700 are spaced apart from each other. The mainboard module 700 is located between the power supply battery 600 and the smudge detection module 400, and electrically connected to the photovoltaic device 500 and the smudge detection module 400 through wires C respectively.

Furthermore, the mainboard module 700 includes a circuit board 710, a communication unit 720, a storage unit 730 and a control unit 750. The circuit board 710 is secured to the bottom 331 of the recess 330 through some studs B, and the communication unit 720, the storage unit 730 and the control unit 750 are respectively soldered to the circuit board 710.

The communication unit 720 is connected to the host server 100 through the network architecture N. The storage unit 730 is stored with any numerical information or temporary data transmitted from the smudge detection module 400 and the photovoltaic device 500, as well as control programs for performing specific tasks and work. The control program is not limited to the form of software, firmware and/or programs. The control unit 750 is electrically connected to the smudge detection module 400, the power supply battery 600, the communication unit 720, the storage unit 730 and the photovoltaic device 500 for respectively transmitting power supply value of the electric energy and the shielding degree of the light transmissive cover 350 to the host server 100.

The communication unit 720 is electrically connected to the host server 100 through a wireless manner, for example, through an antenna unit 760 to be wirelessly connected to the host server 100. The communication unit 720 can support several communication protocols such as Global System for Mobile communication (GSM), Personal Handyphone System (PHS), Code Division Multiple Access (CDMA), Broadband Code Wideband Code Division Multiple Access (WCDMA), Long Term Evolution (LTE), Worldwide interoperability for Microwave Access (WiMAX), Wireless Fidelity (Wireless Fidelity, Wi-Fi) and Bluetooth etc., but the present disclosure is not limited thereto.

In addition, the mainboard module 700 further includes a global positioning system (GPS) unit 740. The GPS unit 740 is soldered on the circuit board 710 and electrically connected to the control unit 750 for obtaining absolute time (i.e., location time of the geographical location) and location coordinates where the smudge detection device 300 (i.e., the container 310 or the aforementioned observed object D) is situated at from the satellite signal through the antenna unit 760, and then the control unit 750 transmits the location coordinates to the host server 100. Since the smudge detection module 400 is not needed to perform smudge detection around the clock, when a setup time is up, by comparing the absolute time and the setup time, the control unit 750 immediately executes the activation and deactivation of the smudge detection module 400 through the control program stored in the storage unit 730 so as to save energy and decrease the loss of product life.

For example, the communication unit 720 is not limited to various communication chips, mobile communication chips, Bluetooth chips, Long Term Evolution (LTE) chips or WiFi chips, etc.; the control unit 750 is a central processing unit (CPU), single chip or microcontroller; the storage unit 730 is a removable random access memory, flash memory or hard disk, etc.; the GPS unit 740 is not limited to various types of GPS chips, and the GPS unit 740 supports, for example, global navigation satellite systems (Global Navigation Satellite System, GNSS) and other protocols, the network architecture N is not limited to the Internet, WIFI networks, Intranet networks or Extranet networks belonging to the same enterprise or organization, etc., however, the disclosure is not limited to the above-mentioned aspects.

Also, the smudge detection module 400 includes a wire board 410, a receiving unit 420 and a plurality of outputting units 430. The wire board 410 is secured to the bottom 331 of the recess 330 through some studs B, and the receiving unit 420 and the outputting units 430 are respectively soldered to the wire board 410, and the outputting units 430 are spaced arranged to surround the receiving unit 420. The outputting units 430 are electrically connected to the control unit 750 for sending energy waves towards the light transmissive cover 350, and the energy waves might be partially reflected back by the smudge on the light transmissive cover 350. The receiving unit 420 is electrically connected to the control unit 750 for receiving reflected signals returned from the light transmissive cover 350 for the control unit to transmit the reflected signals to the host server 100.

In this embodiment, for example, each of the outputting units 430 is a light emitter (e.g., light emitting diode or infrared diode), and the receiving unit 420 is a light sensor (e.g., photodiode). In this way, when the light emitter emits light L1 towards the light transmissive cover 350, one part of the light L1 penetrates through the light transmissive cover 350, and another part of the light L1 is reflected by the light transmissive cover 350 and returns to the smudge detection module 400. Therefore, when the light sensor receives the reflected light L2 returned from the light transmissive cover 350, the light sensor converts the reflected light L2 into a photoelectric signal. However, the light of the light emitter is not limited to be the visible light or invisible light.

Therefore, after the photoelectric signal is transmitted to the host server 100, the host server 100 compares the difference between the photoelectric signal and the preset threshold to determine whether the outer surface of the light transmissive cover 350 and the aforementioned observed object D is smudgy so as to decide whether a smudge-detected alert is issued outwardly.

It is noted, when one part of the light transmissive cover 350 is covered by foreign matter (e.g., dust, pollen, poultry excrement or a combination thereof), compared to the cleaner part of the light transmissive cover 350, the light sensor will receive stronger photoelectric signals. In this way, according to the difference in photoelectric signals, the smudge detection module 400 can decide the shielding degree of the light transmissive cover 350 being covered by foreign matters.

However, the disclosure is not limited to this. In other embodiments, the outputting units 430 of the smudge detection module 400 also can be replaced by an ultrasonic transmitter, and the receiving unit 420 also can be replaced by an ultrasonic receiver.

Furthermore, a supporting flange 340 is protruded from an opening of the recess 330, and the supporting flange 340 surrounds a receiving groove 341 for loading the light transmissive cover 350. The light transmissive cover 350 is placed flat within the receiving groove 341 so that the light transmissive cover 350 is totally embedded within the receiving groove 341, and the outer surface of the light transmissive cover 350 is flush with the top 321 of the container 310. In addition, a portion of the supporting flange 340 is formed with a receiving groove 342 for receiving the photovoltaic device 500.

Furthermore, the light transmissive cover 350 is a single light-transmissive plate 351 (e.g., glass plate or acrylic plate). The single light-transmissive plate 351 is divided into a first area 351A and a second area 351B along a horizontal direction, and the first area 351A and the second area 351B are adjacent to each other, and there is no physical boundary between the first area 351A and the second area 351B. The photovoltaic device 500 is only located in the first area 351A of the single light-transmissive plate 351 and directly integrated into one side of the first area 351A facing towards the mainboard module 700. Furthermore, the photovoltaic device 500 is directly integrated into one surface (hereinafter referred to as the inner surface) of the first area 351A of the single light-transmissive plate 351 facing towards the mainboard module 700, and merely arranged on the first area 351A. In other words, the area of the single light-transmissive plate 351 covered by the photovoltaic device 500 is the first area 351A of the single light-transmissive plate 351, and the other thereof not covered by the photovoltaic device 500 is the second area 351B, however the disclosure is not limited thereto. The smudge detection module 400 is faced towards the second area 351B of the single light-transmissive plate 351 for detecting the shielding degree of the second area 351B being covered by foreign matters.

More specifically, the photovoltaic device 500 includes a photovoltaic panel 510 and a junction box 520. The photovoltaic panel 510 is placed flat in the receiving groove 342 and directly attached to the inner surface of the single light-transmissive plate 351. The junction box 520 is located on one side of the supporting flange 340 facing away from the receiving groove 342, and electrically connected to the photovoltaic panel 510, the power supply battery 600 and the mainboard module 700 for transmitting the electric energy generated by the photovoltaic panel 510 to the power supply battery 600, and transmitting the power supply value of the electric energy to the mainboard module 700.

Figure 4:
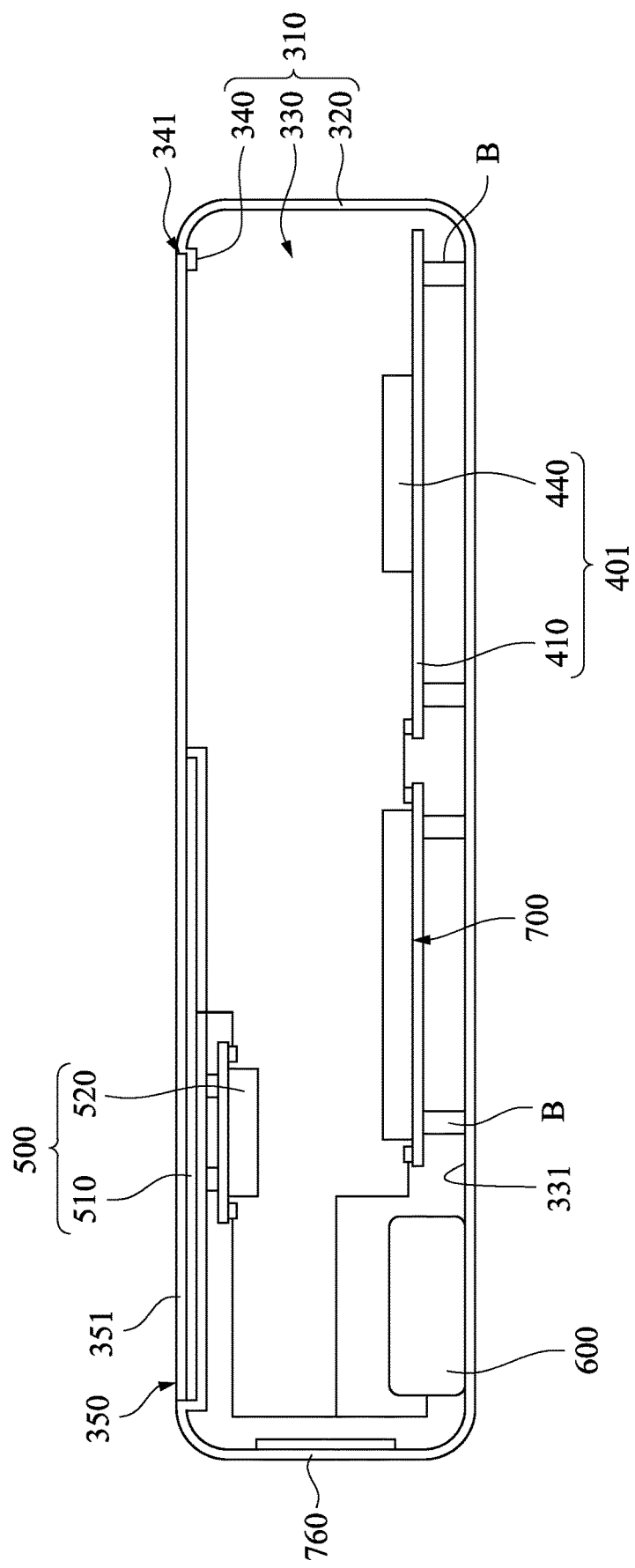
FIG. 4 is a schematic view of a smudge detection device according to one embodiment of the present disclosure.

FIG. 4 is a schematic view of a smudge detection device 301 according to one embodiment of the present disclosure. As shown in FIG. 4, the smudge detection device 301 of the present embodiment is substantially the same to the smudge detection device 300 in FIG. 1, and the difference therebetween is that, the receiving unit 420 and the outputting units 430 in the smudge detection module 401 of this embodiment can also be replaced with a camera unit 440. The camera unit 440 is disposed within the recess 330, and soldered to the wire board 410. The camera unit 440 is electrically connected to the control unit 750 for capturing images of the light transmissive cover 350 for the control unit 750 to transmit the images to the host server 100.

It is noted, when one part of the light transmissive cover 350 is covered by foreign matter (e.g., dust, pollen, poultry excrement or a combination thereof), compared to the cleaner part of the light transmissive cover 350, the image captured by the camera unit 440 will with more shadows. In this way, depending on the amount of shadows in the image, the smudge detection module 400 can decide the shielding degree of the light transmissive cover 350 being covered by foreign matters.

Figure 5:
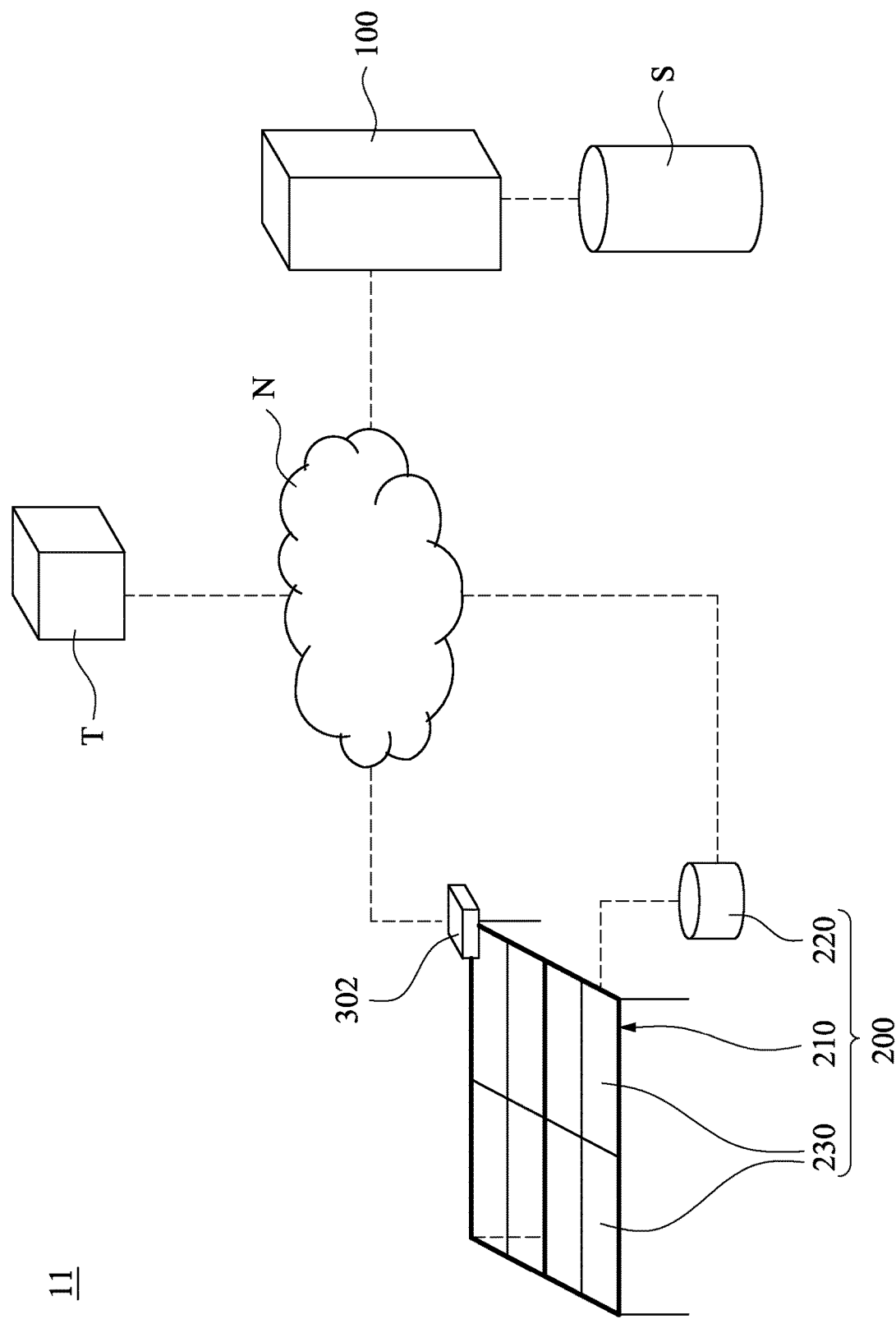
FIG. 5 is a schematic view of a smudge detection system implemented on a solar energy site according to one embodiment of the present disclosure.

FIG. 5 is a schematic view of a smudge detection system 11 implemented on a solar energy site according to one embodiment of the present disclosure. As shown in FIG. 5, the smudge detection device 302 of the present embodiment is substantially the same to the smudge detection device 300 in FIG. 1, and the difference therebetween is that, the smudge detection system 11 is implemented on a solar energy site, and the solar energy site includes a solar array 200. The solar array 200 is connected to the host server 100 through the network architecture N. The solar array 200 includes a frame 210, an inverter 220 and a plurality of power generation modules 230. Each of the power generation modules 230 is a solar module and arranged on the frame 210. The power generation modules 230 are arranged in an array. The inverter 220 is electrically connected to the power generation modules 230 respectively, and is connected to the host server 100 through the network architecture N, so as to receive and output the power supply values of the power generation modules 230 to the host server 100. In this way, when the host server 100 issues a smudge-detected alert outwardly, the controller can be programmed to decide that the light incident surface of the adjacent power generation module 230 is also polluted (e.g., smudgy) to the same extent, and thus, subsequent cleaning procedures can be then performed.

However, the disclosure is not limited to this detection mechanism. In other embodiments, when the host server 100 determines that the surface of the light transmissive cover 350 is smudgy, the host server 100 continues to compare the power generation of the solar array 200. When the power supply value of the power generation module 230 is approximately the same as the power supply value of the photovoltaic device 500, the host server 100 will issue a smudge-detected alert outwardly. Therefore, it can be inferred that the light incident surface of the adjacent power generation module 230 is also polluted (e.g., smudgy) to the same extent, and subsequent cleaning procedures can be then performed.

Figure 6:
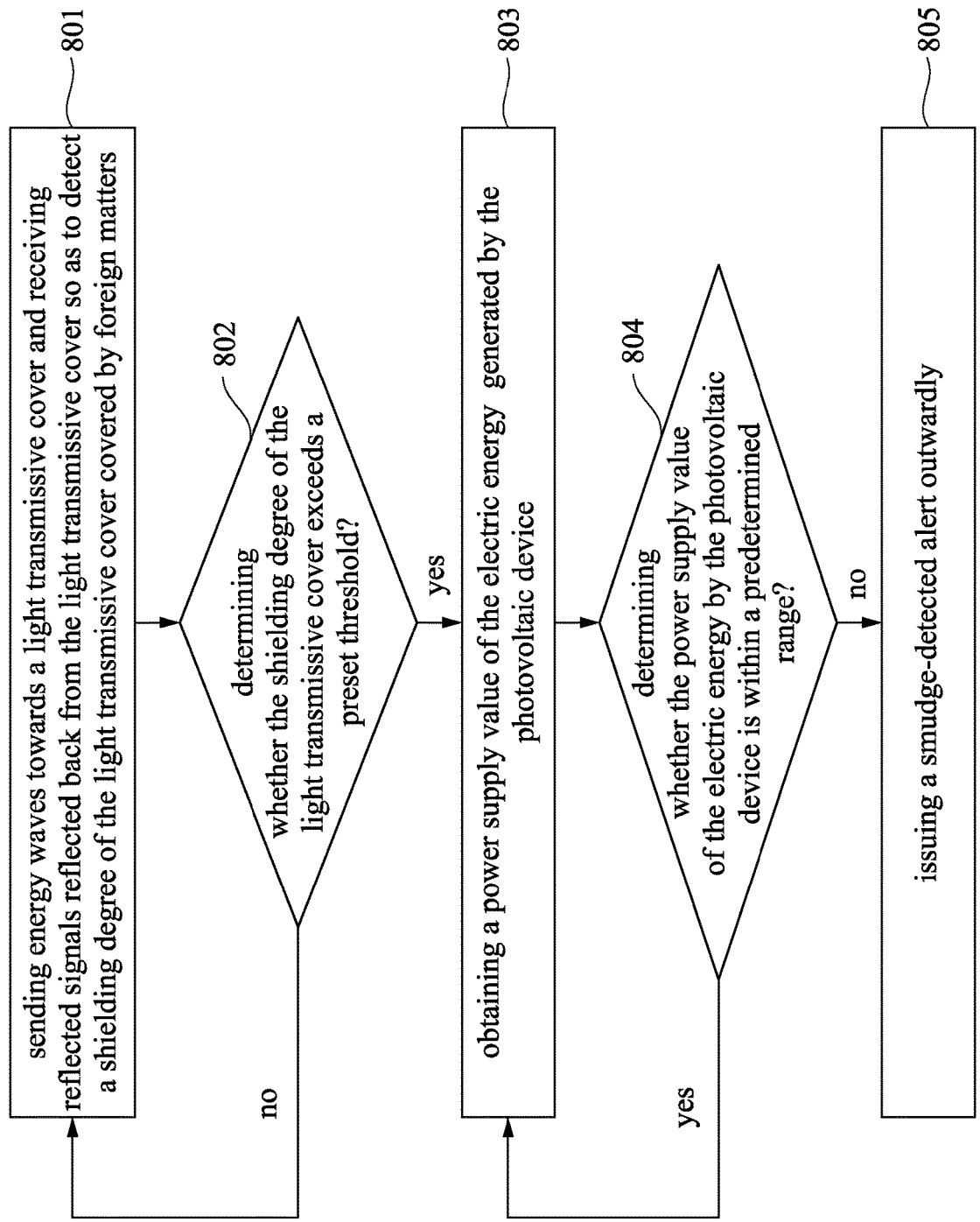
FIG. 6 is a flowchart of a smudge detection method according to one embodiment of the present disclosure.

FIG. 6 is a flowchart of a smudge detection method according to one embodiment of the present disclosure. As shown in FIG. 6, the smudge detection method includes step 801 to step 805 described below. In the step 801, energy waves are sent towards a light transmissive cover and reflected signals returned from the light transmissive cover are received so as to obtain a shielding degree of the light transmissive cover covered by foreign matters. In the step 802, a determination is made as to whether the shielding degree of the light transmissive cover exceeds a preset threshold, if yes, go to step 803, otherwise back to step 801. In the step 803, a power supply value of the electric energy generated by the photovoltaic device is obtained. In the step 804, a determination is made as to whether the power supply value of the electric energy generated by the photovoltaic device is within a predetermined range, if yes, back to step 803, otherwise go to step 805. In the step 805, a smudge-detected alert is issued outwardly.

However, the disclosure is not limited thereto. In other embodiments, the order of steps 801 to 802 and steps 803 to 804 may also be performed alternately.

More specifically, in a detailed option of this embodiment, in step 804, the host server 100 processes according to detailed steps as followed.

First, the host server 100 collects an ideal power supply value of the photovoltaic device 500 (e.g., the recent best performance after installation); then, the host server 100 compares the power supply value of the photovoltaic device 500 with the ideal power supply of the photovoltaic device 500, and obtains a difference value between the power supply value and the ideal power supply; next, a determination is made as to whether the difference value is in the predetermined range above, if so, back to step 803, otherwise, continue to step 805.

More specifically, in a detailed option of this embodiment, in step 804, as shown in FIG. 1 to FIG. 3, the host server 100 proceeds according to the following detailed steps. First, the host server 100 obtains the position coordinates of the solar energy site. For example, the host server 100 obtains the position coordinates and absolute time through the GPS unit 740; then, the host server 100 obtains weather data and real-time sunshine data of the location of the smudge detection device 300 (i.e., the container 310 or the observed object D) according to the position coordinates of the container above. For example, the host server 100 obtains the weather data of the day through a weather database S. The host server 100 estimates an expected power supply value of a photovoltaic device 500 based on absolute time, position coordinates, weather data, seasonal time, dynamic changes of cloud clusters, solar elevation angle and azimuth angle, and the host server 100 obtains the expected power supply value through a comparison table. The comparison table includes historical variables and corresponding expected power supply values; then, the power supply value of the photovoltaic device 500 is compared with the expected power supply value, and a difference value is obtained; and a determination is made as to whether the difference value is within the expected range, if so, return to step 803, otherwise, a smudge-detected alert will be issued outwardly.

It is noted, the detailed options of the above step 804 may also be used simultaneously or sequentially.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure covers modifications and variations of this disclosure provided they fall within the scope of the following claims and their equivalents.

What is claimed is:

1. A smudge detection device, comprising:
   a power supply battery;
   a container comprising a main body disposed on at least one power generation module, a recess formed on a top of the main body, and a light transmissive cover covering the recess;
   a smudge detection module located within the recess for detecting a shielding degree of the light transmissive cover being covered by foreign matters;
   a photovoltaic device disposed on the main body for generating and transmitting electric energy into the power supply battery;
   a mainboard module received within the recess, comprising:
      a communication unit connected to a host server through a network architecture; and
      a control unit electrically connected to the smudge detection module, the power supply battery, the communication unit and the photovoltaic device, for respectively transmitting power supply value of the electric energy and the shielding degree of the light transmissive cover to the host server.

2. The smudge detection device of claim 1, wherein the light transmissive cover is a single light-transmissive plate, and the single light-transmissive plate is divided into a first area and a second area,
   wherein the photovoltaic device is directly integrated into the first area of the single light-transmissive plate, and the smudge detection module is faced towards the second area of the single light-transmissive plate from inside the recess for detecting the shielding degree of the second area being covered, wherein the shielding degree of the second area being covered is the same as the shielding degree of the light transmissive cover being covered.

3. The smudge detection device of claim 1, wherein the smudge detection module comprises:
   at least one outputting unit disposed within the recess, and electrically connected to the control unit for sending energy waves towards the light transmissive cover; and
   a receiving unit disposed within the recess, and electrically connected to the control unit for receiving reflected signals returned from the light transmissive cover for the control unit to transmit the reflected signals to the host server.

4. The smudge detection device of claim 3, wherein the at least one outputting unit comprises a plurality of outputting units, and the outputting units are spaced arranged to surround the receiving unit.

5. The smudge detection device of claim 3, wherein the at least one output unit is a light emitter, and the receiving unit is a light sensor; or
the at least one output unit is an ultrasonic transmitter, and the receiving unit is an ultrasonic receiver.

6. The smudge detection device of claim 1, wherein the smudge detection module comprises:
a camera unit disposed within the recess, and electrically connected to the control unit for capturing images of the light transmissive cover for the control unit to transmit the images to the host server.

7. The smudge detection device of claim 1, wherein the mainboard module further comprises:
a global positioning system (GPS) unit electrically connected to the control unit for obtaining location coordinates where the container is situated at, so that the control unit transmits the location coordinates of the container to the host server.

8. A smudge detection system, suitable for determining whether a surface of an observed object is smudgy, the smudge detection system comprising:
a host server; and
a smudge detection device comprising:
a power supply battery;
a container comprising a main body disposed on the observed object, a recess formed on a top of the main body, and a light transmissive cover covering the recess;
a smudge detection module located within the recess for detecting a shielding degree of the light transmissive cover being covered by foreign matters;
a photovoltaic device disposed on the main body for generating and transmitting electric energy into the power supply battery; and
a mainboard module received within the recess, electrically connected to the smudge detection module, the power supply battery and the photovoltaic device, and connected to a host server through a network architecture, for respectively transmitting power supply value of the electric energy and the shielding degree of the light transmissive cover to the host server,
wherein the host server determines whether the shielding degree of the light transmissive cover exceeds a preset threshold, and whether the power supply value of the photovoltaic device is within a predetermined range; and
when the host server determines that the shielding degree exceeds the preset threshold, and the power supply value of the photovoltaic device is not within the predetermined range, the host server issues a smudge-detected alert.

9. The smudge detection system of claim 8, wherein the light transmissive cover is a single light-transmissive plate, and the single light-transmissive plate is divided into a first area and a second area,
wherein the photovoltaic device is directly integrated into the first area of the single light-transmissive plate, and the smudge detection module is faced towards the second area of the single light-transmissive plate from inside the recess for detecting the shielding degree of the second area being covered,
wherein the shielding degree of the second area being covered is the same as the shielding degree of the light transmissive cover being covered.

10. The smudge detection system of claim 8, wherein the smudge detection module comprises:
at least one outputting unit disposed within the recess, and electrically connected to the mainboard module for sending energy waves towards the light transmissive cover; and
a receiving unit disposed within the recess, and electrically connected to the mainboard module for receiving reflected signals returned from the light transmissive cover,
wherein the mainboard module transmits the reflected signals to the host server, so that the host server is able to compare a difference between the reflected signal and the preset threshold.

11. The smudge detection system of claim 10, wherein the at least one outputting unit comprises a plurality of outputting units, and the outputting units are spaced arranged to surround the receiving unit.

12. The smudge detection system of claim 10, wherein the at least one output unit is a light emitter, and the receiving unit is a light sensor; or
the at least one output unit is an ultrasonic transmitter, and the receiving unit is an ultrasonic receiver.

13. The smudge detection system of claim 8, wherein the smudge detection module comprises:
a camera unit disposed within the recess, and electrically connected to the mainboard module for capturing images of the light transmissive cover for the mainboard module to transmit the images to the host server.

14. The smudge detection system of claim 8, wherein when the host server determines whether the power supply value of the photovoltaic device is within the predetermined range, the host server further proceeds:
to collect an ideal power supply value of the photovoltaic device;
to compare the power supply value of the photovoltaic device with the ideal power supply value to obtain a difference value;
to determine whether the difference value is in the predetermined range; and
to issue the smudge-detected alert when the difference value is not within the predetermined range.

15. The smudge detection system of claim 8, wherein the mainboard module further comprises:
a global positioning system (GPS) unit electrically connected to the mainboard module for obtaining location coordinates where the container is situated at, so that the mainboard module transmits the location coordinates of the container to the host server; and
when the host server determines whether the power supply value of the photovoltaic device is within the predetermined range, the host server further proceeds:
to obtain weather data and real-time sunshine data based on the location coordinates of the container,
to estimate an expected power supply value based on the weather data and the real-time sunshine data;
to compare the power supply value and the expected power supply value of the photovoltaic device to obtain a difference value; and to issue the smudge-detected alert when the difference value is not within the predetermined range.

* * * * *